United States Patent
Weissenmayer et al.

(10) Patent No.: US 10,488,216 B2
(45) Date of Patent: Nov. 26, 2019

(54) METHOD FOR OPERATING A MOTOR-DRIVEN SPORTS DEVICE

(71) Applicant: Robert Bosch GmbH, Stuttgart (DE)

(72) Inventors: Simon Weissenmayer, Flein (DE); Joerg Haffelder, Bad Rappenau (DE); Timo Koenig, Unterheinriet (DE)

(73) Assignee: Robert Bosch GmbH, Stuttgart (DE)

(*) Notice: Subject to any disclaimer, the term of this patent is extended or adjusted under 35 U.S.C. 154(b) by 131 days.

(21) Appl. No.: 15/357,573

(22) Filed: Nov. 21, 2016

(65) Prior Publication Data

US 2018/0141460 A1    May 24, 2018

(51) Int. Cl.

| | |
|---|---|
| *G01C 21/20* | (2006.01) |
| *G01C 21/36* | (2006.01) |
| *G01C 23/00* | (2006.01) |
| *B63B 49/00* | (2006.01) |
| *B63J 99/00* | (2009.01) |

(52) U.S. Cl.
CPC ......... *G01C 21/3667* (2013.01); *G01C 21/20* (2013.01); *G01C 23/00* (2013.01); *B63B 49/00* (2013.01); *B63J 2099/008* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,286,264 B2* | 3/2016 | Johnson | ............... | B60W 30/146 |
| 2004/0006423 A1* | 1/2004 | Fujimoto | ............. | G05D 1/0206 |
| | | | | 701/467 |
| 2007/0001830 A1* | 1/2007 | Dagci | .................. | B60K 31/185 |
| | | | | 340/438 |
| 2007/0233339 A1* | 10/2007 | Wehrlen | ............... | G05D 1/0274 |
| | | | | 701/25 |
| 2008/0243350 A1* | 10/2008 | Harkness | ................. | B60Q 9/00 |
| | | | | 701/93 |
| 2008/0258890 A1* | 10/2008 | Follmer | ................ | B60R 25/102 |
| | | | | 340/439 |
| 2012/0215416 A1 | 8/2012 | Poulin | | |
| 2013/0110367 A1* | 5/2013 | To | .......................... | B60K 31/18 |
| | | | | 701/70 |

(Continued)

FOREIGN PATENT DOCUMENTS

DE    19538288 A1    4/1997

*Primary Examiner* — Adam D Tissot
*Assistant Examiner* — Edward J Pipala
(74) *Attorney, Agent, or Firm* — Norton Rose Fulbright US LLP; Gerard Messina

(57) ABSTRACT

A method for operating a motor-driven sports device, in which a maximum speed of the sports device is at least intermittently restricted as a function of a position of the sports device. A device for operating a motor-driven sports device is described, the device including a position-ascertainment unit which is set up for ascertaining the position of the sports device; a speed-ascertainment unit which is set up for ascertaining an actual speed of the sports device; an allocation unit which is set up for allocating a permitted maximum speed to the position of the sports device; a comparison unit which is set up for comparing a permitted maximum speed to an actual speed; and a restriction unit which is set up for restricting a maximum speed of the sports device if the actual speed exceeds the permitted maximum speed.

11 Claims, 3 Drawing Sheets

(56) References Cited

U.S. PATENT DOCUMENTS

| | | | |
|---|---|---|---|
| 2013/0289874 A1* | 10/2013 | Taguchi | B60W 30/146 |
| | | | 701/533 |
| 2016/0167513 A1* | 6/2016 | Arita | B60K 35/00 |
| | | | 340/441 |
| 2017/0144740 A1* | 5/2017 | Ito | B63H 21/213 |
| 2018/0037225 A1* | 2/2018 | Knoller | B60W 30/146 |
| 2018/0079306 A1* | 3/2018 | Kim | B60K 37/02 |

* cited by examiner

METHOD FOR OPERATING A MOTOR-DRIVEN SPORTS DEVICE

FIELD

The present invention relates to a method and a device for operating a motor-driven sports device. In addition, the present invention relates to a computer program which is set up to execute the method of the present invention, and to an electronic storage medium on which the computer program is stored.

BACKGROUND INFORMATION

Motor-driven sports devices such as jet skis, snowmobiles or quads are often equipped with high-performance motors but at the same time, must also be safely manageable by less experienced operators. Furthermore, motor-driven sports devices are frequently used in crowded areas. For instance, jet skis are often employed in the vicinity of bathing beaches and before they can be used in open waters, must often travel through a strip of water near the beach that is used by careless swimmers, for instance. In order to avoid accidents, it is therefore necessary to operate the jet ski only at a restricted maximum speed in such a strip of water close to a beach. In addition, it should be ensured that a jet ski does not enter an area of the water that is heavily frequented by swimmers and which therefore does not allow the use of jet skis.

Conventionally, jet skis are equipped with a GPS receiver which is set up to ascertain the speed of the jet ski and to display it to the user of the jet ski. It is the user's own responsibility to adjust the speed to the currently traveled area, and also to ensure, on his own, that no zones are entered that are closed to jet skis.

SUMMARY

An example method according to the present invention may have the advantage that a maximum speed of the motor-driven sports device, such as a jet ski, a snowmobile or a quad, is at least intermittently restricted as a function of a position of the sports device. In an advantageous further development, it is therefore provided to implement the restriction of the maximum speed as a function of the time of day. For example, the maximum speed during the day may be restricted, whereas there is no restriction of the maximum speed during the night. When using the present invention in a jet ski, for example, it is therefore possible to take into account the fact that more swimmers who pose a potential collision risk with the jet ski have to be expected during the day.

In addition, the position of the sports device is advantageously able to be ascertained and the position of the sports device is able to be linked with a permitted maximum speed, which is provided with the aid of an electronic map.

It is furthermore advantageous that the electronic map includes a plurality of operating zones to which a respective permitted maximum speed is allocated. Such operating zones, for example, may be established by a public authority or may also be set by an operator of a leasable motor-driven sports device, for example.

It is advantageous that the electronic map as well as the position of the sports device are displayed to a user of the sports device via a display device.

It is advantageous that the displayed electronic map is linked to an instantaneous orientation of the sports device and that a location of an operating zone that corresponds to a non-restricted permitted maximum speed is displayed via an edge region of the display device. Here, a location is meant to denote the direction in which the operating zone that corresponds to a non-restricted permitted maximum speed is located. In an advantageous further refinement, the location is to be understood as a linkage between direction and distance of the operating zone that corresponds to a non-restricted permitted maximum speed.

The electronic map, for instance, may be displayed on the display device in such a way that a region situated in front of the sports device is shown in an upper area of the display device. The user of the sports device is thus easily able to transfer the information of the electronic map to his or her surroundings. By displaying the location of an operating zone that corresponds to a non-restricted permitted maximum speed, the direction in which the user must steer the sports device in order to once again enter an area where the maximum permitted speed is not restricted is indicated to the user of the sports device in an uncomplicated manner. Using an edge region of the display device for displaying this location allows for a simple and intuitive linkage of the position of the sports device to a preferred direction to be headed for.

It is especially advantageous if an actual speed and/or the position of the sports device are/is ascertained with the aid of satellite positioning technology. In one particularly advantageous embodiment, the satellite positioning system is a GPS, Galileo or other commercially available satellite positioning service.

It is advantageous to restrict the maximum speed by reducing a motor output variable if the actual speed exceeds the permitted maximum speed. The restriction of the maximum speed has the advantage over the pure restriction of a motor output variable that it can always be ensured that the motor-driven sports device still remains controllable. If the motor-driven sports device is a jet ski, for example, a restriction of a motor output variable that is independent of the speed could lead to drifting of the sports device when the available motor output speed is insufficient to compensate for current or wind, for instance.

The device according to the present invention for operating a motor-driven sports device may have an advantage that a position-ascertainment unit is available which is set up for ascertaining the position of the sports device; that a speed unit is provided which is set up for ascertaining an actual speed of the sports device; that an allocation unit is provided which is set up for allocating a permitted maximum speed to the position of the sports device; that a comparison unit is provided which is set up for comparing a permitted maximum sped with an actual speed; and that a restriction unit is provided which is set up for restricting a maximum speed of the sports device if the actual speed exceeds the permitted maximum speed.

It is furthermore advantageous if the device includes a display device which is set up for displaying a map as well as speed zones allocated to the map.

It is particularly advantageous if the position-ascertainment unit and/or the speed-ascertainment unit include(s) a satellite-positioning module.

Also advantageous is a computer program which is set up, or through compilation, is being set up, for executing each step of the method according to the present invention.

Another advantage is an electronic storage medium on which the computer program is stored, as well as an electronic control unit that includes the electronic storage medium.

Below, an exemplary embodiment of the present invention is explained in greater detail on the basis of the figures.

DETAILED DESCRIPTION OF EXAMPLE EMBODIMENTS

Below, a specific embodiment is described in greater detail. It is assumed by way of example that the motor-driven sports device is a jet ski. However, the method according to the present invention and the device according to the present invention may also be used in other motor-driven sports devices, such as in snowmobiles or quads.

Figure 1:
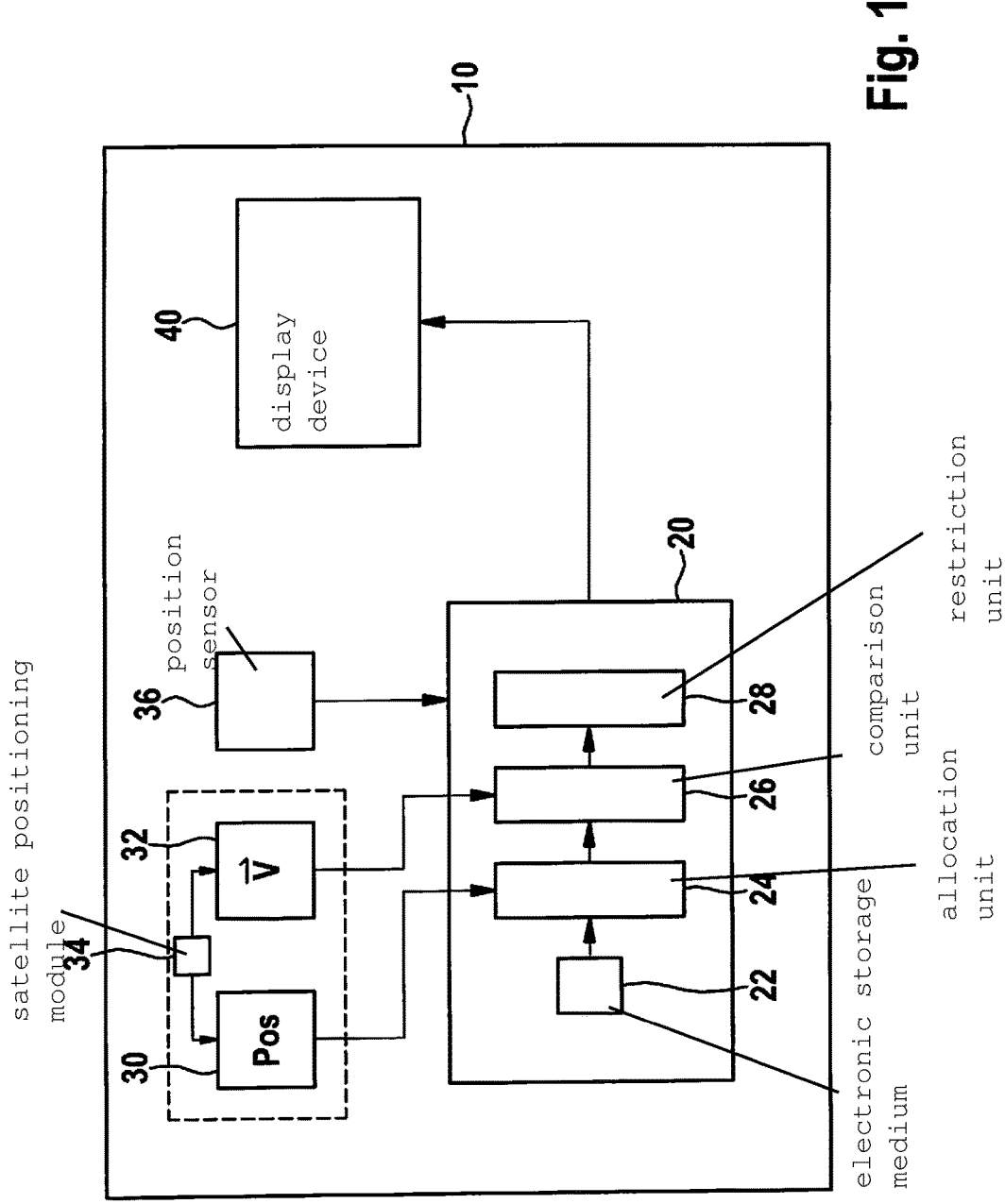
FIG. 1 show a schematic representation of a motor-driven sports device which includes the device according to the present invention.

FIG. 1 shows a schematic representation of the device according to the present invention. A motor-driven sports device (10) includes a control unit (20). Control unit (20) encompasses an electronic storage medium (22). In addition, control unit (20) includes an allocation unit (24), a comparison unit (26) and a restriction unit (28). Motor-driven sports device (10) furthermore includes a position-ascertainment unit (30), a speed-ascertainment unit (32) and a satellite-positioning module (34). In an alternative embodiment, satellite-positioning module (34) may be either part of the position-ascertainment unit (30) or part of speed-ascertainment unit (32). In a further alternative embodiment, position-ascertainment unit (30) and speed-ascertainment unit (32) are realized in a shared module. This module may also include satellite-positioning module (34).

Motor-driven sports device (10) furthermore includes a position sensor (36) and a display device (40). Position sensor (36) is set up in such a way that it ascertains the orientation of the sports device, such as in relation to the earth's magnetic field or a cardinal direction. Position sensor (36), for instance, may be a compass or a rate-of-rotation sensor. Position-ascertainment unit (30), speed-ascertainment unit (32), satellite-positioning module (34) and position sensor (36) are in connection with control unit (20) in such a way that position-ascertainment unit (30), speed-ascertainment unit (32), satellite-positioning module (34) and position sensor (36) are able to transmit signals to control unit (20), directly or indirectly.

Control unit (20) is connected via a signal line to display device (40), so that data processed by control unit (20) are able to be displayed on display unit (40). Display device (40) is shown in detail in FIG. 3.

Figure 2:
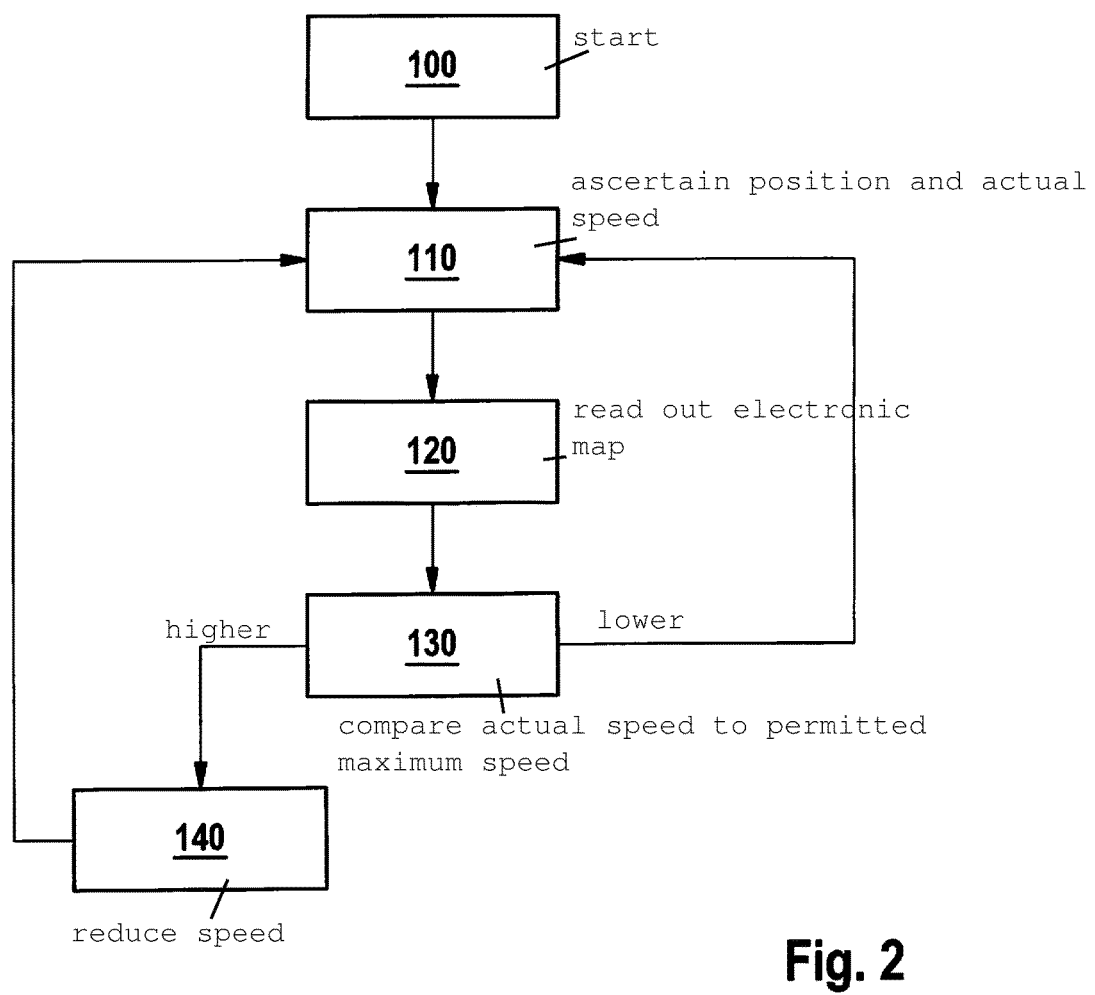
FIG. 2 shows a schematic representation of the method according to the present invention.

FIG. 2 illustrates a schematic sequence of the method of the present invention. In step 100, the method of the present invention is started, for instance in that an ignition is operated on the motor-driven sports device or the operation of the motor-driven sports device is enabled in some other manner. Then, step 110 is executed.

In step 110, the position and the actual speed of motor-driven sports device (10) are ascertained with the aid of position-ascertainment unit (30) and speed-ascertainment unit (32). The actual speed describes the speed over the ground, and not the speed relative to a mobile medium such as water. Step 120 is executed subsequently.

In step 120, the electronic map is read out. It may be stored on electronic medium (22), for instance. The electronic map includes a plurality of operating zones to which a respected permitted maximum speed is allocated. With the aid of the previously ascertained position of the motor-driven sports device, it is therefore possible to allocate a permitted maximum speed to the position of the motor-driven sports device. Step 130 is executed next.

In step 130, the actual speed of the motor-driven sports device ascertained in step 110 is compared with the permitted maximum speed ascertained in step 120. If the comparison reveals that the actual speed ascertained in step 110 is lower than the permitted maximum speed ascertained in step 120, it is continued by step 110. If the comparison indicates that the actual speed ascertained in step 110 is higher than the permitted maximum speed ascertained in step 120, then it is continued by step 140.

In step 140, the speed of the motor-driven sports device is reduced. In a particularly advantageous further development, this reduction of the speed is carried out in increments, that is to say, upon each call-up of step 140, the speed of the motor-driven sports device is reduced by a predefined value such as 2 km/h. Subsequent to step 140, step 110 is executed. In one particularly advantageous further refinement, it is provided to let a certain time elapse before step 110 is carried out again. This time that is to elapse may be 50 or 100 milliseconds, for instance.

Figure 3:
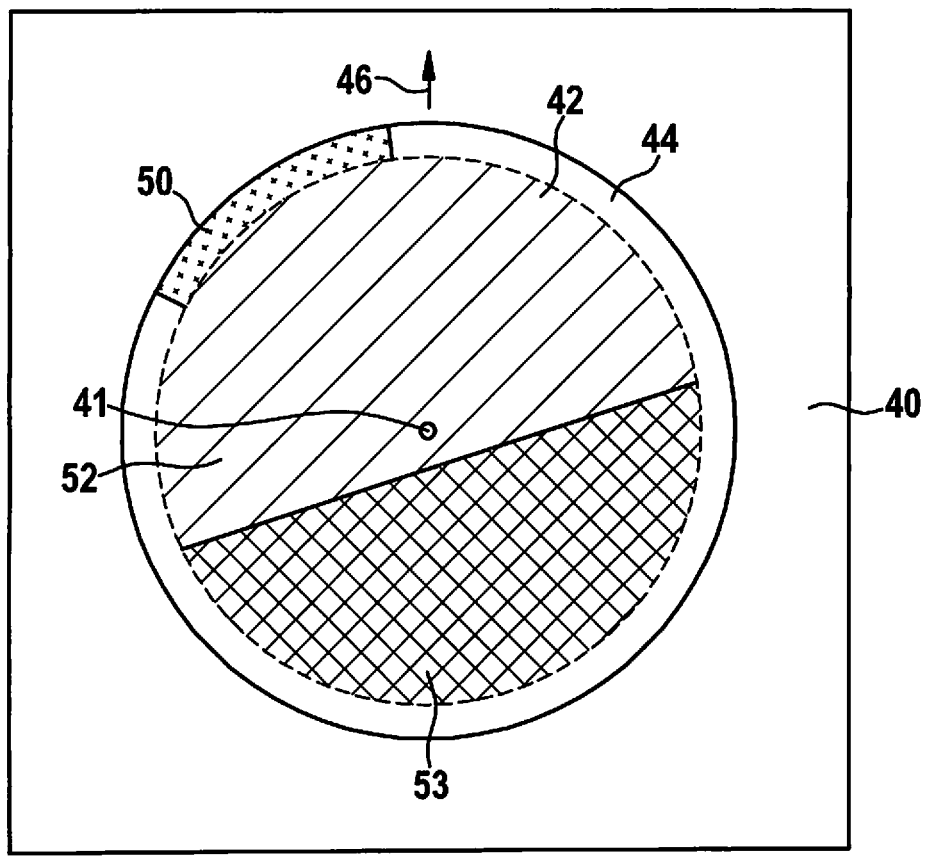
FIG. 3 shows a schematic representation of a display device on which an electronic map that has a plurality of operating zones is displayed to the user of the motor-driven sports device.

FIG. 3 shows a schematic representation of display device (40). Display device (40), which is a display in a preferred development of the present invention, has an actual-position marker (41), which is situated in the center of display device (40). Map cut-away region (42), which in turn is surrounded by an edge region (44), is situated around actual-position marker (41) in the form of a circle. The driving direction of the motor-driven sports device is indicated by an arrow (46), for instance. The respective portion of the electronic map that corresponds to the surrounding region of the current position of the motor-driven sports device is shown in map cut-away region (42).

In the example illustrated, map cut-away region (42) shows a cut-away of the electronic map having two operating zones. First operating zone (52) corresponds to a region in which motor-driven sports device (10) may be operated only at a restricted maximum speed. Such a region, for instance, may be access paths from a beach or a harbor to an open body of water. Second operating zone (53) may be a region of a body of water that is blocked for motor-driven sports device (10), for example. For instance, this can be a bathing area in the immediate vicinity of the beach. If motor-driven sports device (10) enters this region, the permitted maximum speed of the motor-driven sports device is restricted to a minimum value. This minimum value is just sufficient for leaving the blocked region again.

The location of a third operating zone (50) is shown in the edge region (44) of the display device (40). For instance, third operating zone (50) is an operating zone to which no restrictions apply with regard to the permitted maximum speed. This may be the open sea, for example. Since the location of third operating zone (50) is marked in edge region (44) of display device (40) and the driving direction (46) of sports device (10) is marked at the same time, the user of sports device (10) has the opportunity of making the location of third operating zone (50) coincide with driving direction (46) of the sports device by operating the steering system. The user of the sports device is thus able to steer sports device (10) into third operating zone (50) in an uncomplicated manner and on a direct path.

What is claimed is:

1. A method for operating a motor-driven watercraft sports device, comprising:
   at least intermittently restricting a maximum speed of the motor-driven watercraft sports device as a function of a position of the motor-driven watercraft sports device;
   wherein the position of the motor-driven watercraft sports device is ascertained and the position of the motor-driven watercraft sports device is linked with a permitted maximum speed, which is provided with the aid of an electronic map;
   wherein the electronic map includes a plurality of operating zones to which a respective permitted maximum speed is allocated;
   wherein the electronic map as well as the position of the motor-driven watercraft sports device and the operating zones are displayed to a user of the motor-driven watercraft sports device via a display device on the motor-driven watercraft sports device while the user is driving the motor-driven watercraft sports device;
   wherein the displayed electronic map is linked with an instantaneous orientation of the motor-driven watercraft sports device and a position of an operating zone that corresponds to a non-restricted permitted maximum speed is displayed by an edge region of the display device.

2. The method as recited in claim 1, wherein at least one of an actual speed of the motor-driven watercraft sports device and the position of the motor-driven watercraft sports device is ascertained with the aid of satellite positioning technology.

3. The method as recited in claim 1, wherein the maximum speed is restricted by reducing a motor output variable when an actual speed of the motor-driven watercraft sports device exceeds the permitted maximum speed.

4. The method as recited in claim 1, wherein the electronic map is a map of surroundings of the motor-driven watercraft sports device, the electronic map being displayed in the form of a circle, the position of the motor-driven watercraft sports device being displayed in a center of the circle, a position of an operating zone that corresponds to a non-restricted permitted maximum speed being displayed in an edge region of the circle.

5. The method as recited in claim 1, wherein the motor-driven watercraft sports device is a jet ski.

6. A device for operating a motor-driven watercraft sports device, comprising:
   a position-ascertainment unit which is set up for ascertaining the position of the motor-driven watercraft sports device;
   a speed-ascertainment unit which is set up for ascertaining an actual speed of the motor-driven watercraft sports device;
   an allocation unit which is set up for allocating a permitted maximum speed to the position of the motor-driven watercraft sports device;
   a comparison unit which is set up for comparing the permitted maximum speed with an actual speed;
   a restriction unit which is set up for restricting a maximum speed of the motor-driven watercraft sports device if the actual speed exceeds the permitted maximum speed; and
   a display device on the motor-driven watercraft sports device, the display device set up for displaying to a user of the motor-driven watercraft sports device an electronic map as well as operating zones allocated to the map while the user is driving the motor-driven watercraft sports device;
   wherein a respective permitted maximum speed is allocated to each of the operating zones, the allocation unit allocating the permitted maximum speed based on which one of the operating zones the motor-driven watercraft sports device is located and the respective permitted maximum speed assigned to the one of the operating zones;
   wherein the displayed electronic map is linked with an instantaneous orientation of the motor-driven watercraft sports device and the display device displays a position of an operating zone that corresponds to a non-restricted permitted maximum speed by an edge region of the display device.

7. The device as recited in claim 6, wherein at least one of the position-ascertainment unit and the speed-ascertainment unit includes a satellite-positioning module.

8. The device as recited in claim 6, wherein the motor-driven watercraft sports device is a jet ski.

9. A device for operating a motor-driven watercraft sports device, comprising:
   a position-ascertainment unit which is set up for ascertaining the position of the motor-driven watercraft sports device;
   a speed-ascertainment unit which is set up for ascertaining an actual speed of the motor-driven watercraft sports device;
   an allocation unit which is set up for allocating a permitted maximum speed to the position of the motor-driven watercraft sports device;
   a comparison unit which is set up for comparing the permitted maximum speed with an actual speed;
   a restriction unit which is set up for restricting a maximum speed of the motor-driven watercraft sports device if the actual speed exceeds the permitted maximum speed; and
   a display device on the motor-driven watercraft sports device, the display device set up for displaying to a user of the motor-driven watercraft sports device an electronic map as well as operating zones allocated to the map while the user is driving the motor-driven watercraft sports device;
   wherein a respective permitted maximum speed is allocated to each of the operating zones, the allocation unit allocating the permitted maximum speed based on which one of the operating zones the motor-driven watercraft sports device is located and the respective permitted maximum speed assigned to the one of the operating zones;
   wherein the electronic map is a map of surroundings of the motor-driven watercraft sports device, the display device displaying the electronic map in the form of a circle, the position of the motor-driven watercraft sports device being displayed by the display device in a center of the circle, a position of an operating zone that corresponds to a non-restricted permitted maximum speed being displayed by the display device in an edge region of the circle.

10. A non-transitory electronic storage medium on which is stored a computer program for operating a motor-driven watercraft sports device, the computer program, when executed by a processor, causing the electronic control unit to perform:

at least intermittently restricting a maximum speed of the motor-driven watercraft sports device as a function of a position of the motor-driven watercraft sports device;

wherein the position of the motor-driven watercraft sports device is ascertained and the position of the motor-driven watercraft sports device is linked with a permitted maximum speed, which is provided with the aid of an electronic map;

wherein the electronic map includes a plurality of operating zones to which a respective permitted maximum speed is allocated;

wherein the electronic map as well as the position of the motor-driven watercraft sports device and the operating zones are displayed to a user of the motor-driven watercraft sports device via a display device on the motor-driven watercraft sports device while the user is driving the motor-driven watercraft sports device;

wherein the electronic map is a map of surroundings of the motor-driven watercraft sports device, the electronic map being displayed in the form of a circle, the position of the motor-driven watercraft sports device being displayed in a center of the circle, a position of an operating zone that corresponds to a non-restricted permitted maximum speed being displayed in an edge region of the circle.

11. The non-transitory electronic storage medium as recited in claim 10, wherein the motor-driven watercraft sports device is a jet ski.

\* \* \* \* \*